United States Patent Office 2,714,739
Patented Aug. 9, 1955

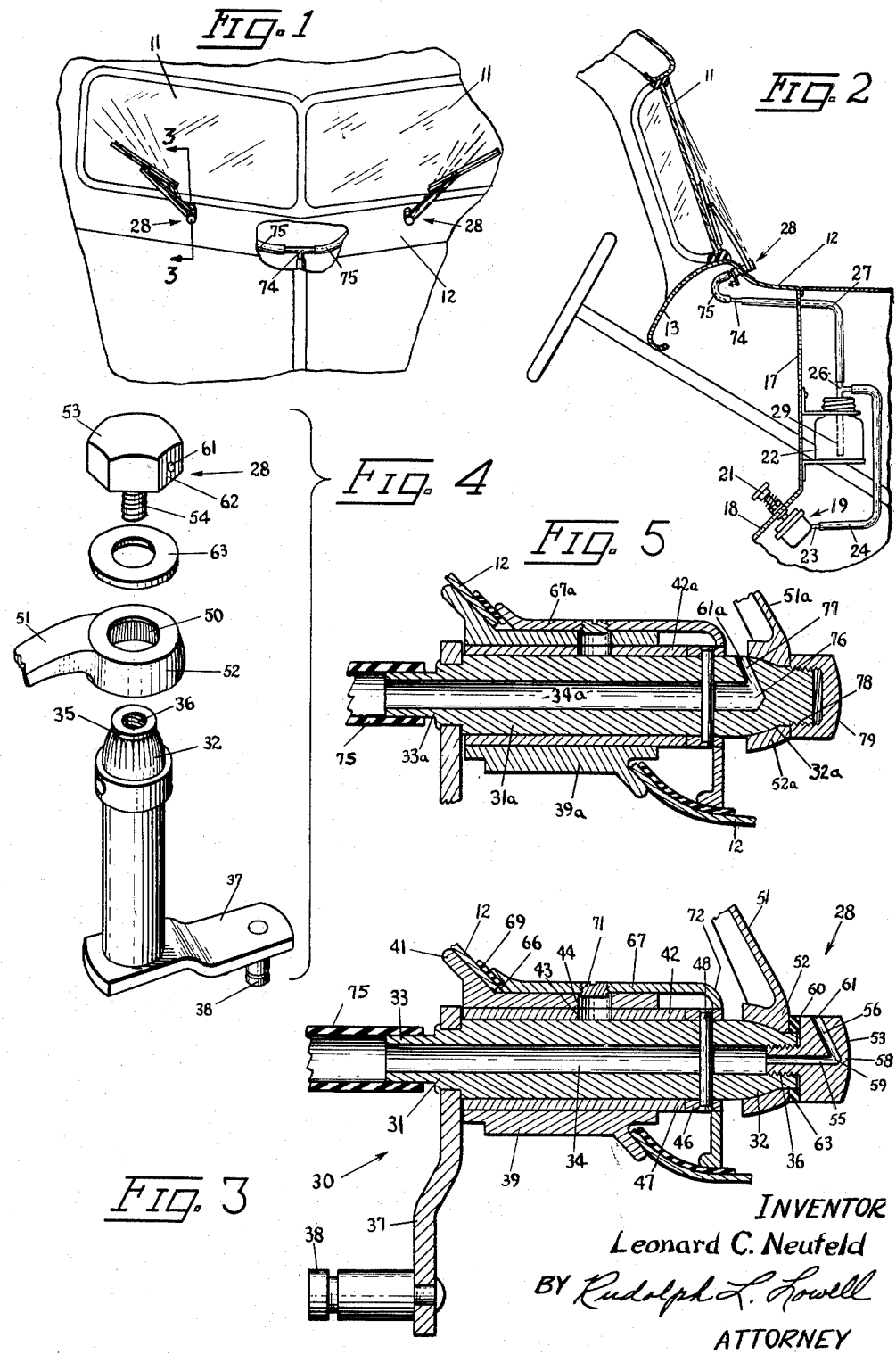

2,714,739
NOZZLE ASSEMBLY FOR VEHICLE WINDSHIELD CLEARING SYSTEMS

Leonard C. Neufeld, Des Moines, Iowa

Application August 21, 1952, Serial No. 305,557

3 Claims. (Cl. 15—250.4)

This invention relates generally to vehicle windshield clearing systems and more particularly to a nozzle assembly for such systems.

An object of this invention is to provide an improved nozzle assembly.

A further object of this invention is to provide in combination with the wiper arm assembly for a vehicle windshield, a fluid discharge orifice for directing fluid onto the windshield in the path of movement of the wiper arm whereby to eliminate the need for any cowl opening other than the one required to receive the supporting shaft for the wiper arm.

A further object of this invention is to provide a hollow supporting shaft for a wiper arm adapted to carry fluid to a nozzle unit, carried at one end of the shaft, and capable of directing fluid onto the windshield in the path of the wiper arm.

Still another object of this invention is to provide a nozzle assembly for a vehicle windshield clearing system which is adapted to be easily installed on an automobile, has the appearance thereof blended as a unit with the usual wiper arm assembly, is economical to manufacture, and efficient in operation.

Further objects, features and advantages of this invention will appear from the following description when taken in connection with the accompanying drawings in which:

Fig. 1 is a fragmentary perspective view of an automobile showing the nozzle assemblies of this invention installed with the wiper arm assemblies on the automobile engine cowl with parts being broken away for the purpose of clarity;

Fig. 2 is a fragmentary foreshortened longitudinal sectional view of an automobile showing a windshield clearing system embodying the nozzle assembly of this invention;

Fig. 3 is an enlarged longitudinal sectional view of the wiper arm and nozzle assembly as seen along the line 3—3 in Fig. 1;

Fig. 4 is an exploded perspective view of the wiper arm and nozzle assembly; and Fig. 5 is an enlarged longitudinal sectional view, illustrated similarly to Fig. 3, showing a modified form of the invention.

With reference to the drawings there is illustrated in Figs. 1 and 2 a windshield clearing system as applied to an automobile having a two piece windshield 11, an engine cowl 12 curved downwardly and forwardly from the lower front edge of the windshield, and an instrument panel or dashboard 13 located rearwardly of the windshield 11. The automobile is further equipped with the usual fire wall 17 and an upwardly and forwardly inclined floorboard section 18 which joins with the lower end of the fire wall 17.

The windshield clearing system includes a pump unit 19 supported from the floorboard section 18 and having a foot actuated plunger 21 projected upwardly from the floorboard section 18. A liquid container or reservoir 22 is carried on the front side of the fire wall 17.

The pump unit 19 has a single connection 23 connected through a flexible conduit 24 with a three-way valve unit 26. A second flexible conduit 27 is connected between the valve unit 26 and one leg of a T-connection 74, the other two legs of which are connected to a pair of flexible tubes 75 for supplying fluid under pressure to the nozzle units indicated generally at 28. The valve unit 26 is supported on the reservoir 22 and is provided with an intake tube 29 which extends into the reservoir 22. On depression of the foot plunger 21 fluid is forced therefrom through the conduits 24, 27 and 75 for discharge from the nozzle units 28. On release of the foot plunger 21 flow of fluid in the conduit 27 is stopped at the valve unit 26, and fluid from the reservoir 22 is drawn into the pump 19 through the intake tube 29 and the conduit 24.

Each nozzle unit 28 of this invention (Figs. 3 and 4) is adapted to be mounted on a wiper arm assembly, indicated generally at 30, which is of a usual type except for the construction of the wiper supporting shaft 31. This shaft 31 is formed adjacent its front end with a tapered and fluted section 32 which terminates at its forward end in a short section 35 of a reduced diameter. At its rear end the shaft 31 is provided with a reduced section 33 about which is mounted one end of a flexible tube 75. An axial bore or fluid passage 34 in the shaft 31 is provided at its front end with an internally threaded section 36. A rock arm 37 mounted on the shaft 31 adjacent the forward end of the reduced section 33 carries a pin 38 at its free end for connection with a usual wiper arm actuating mechanism (not shown).

A journal housing 39 for the shaft 31 is of a usual construction formed with a flange or seat 41 adapted to engage the underside of the engine cowl 12. A brass bearing sleeve 42, carried within the housing 39 and about the shaft 31 is formed with a lubricant opening 43 which is in registration with a corresponding opening 44 formed in the housing 39. The bearing sleeve 42 is in a pressed fit within the housing 39 and is retained adjacent the rock arm 37, against movement axially of the shaft 31 by a stock collar 46 mounted about the shaft 31 against the front end 47 of the bearing sleeve 42. The collar 46 is fixed to the shaft 31 by a locking pin 48.

A usual wiper blade supporting arm 51 is formed with a hub portion 52 provided with a central opening 50. The opening 50 is of a tapered and fluted construction corresponding to that of the front section 32 of the shaft 31, so as to be received on the shaft section 32 in locked engagement against rotational movement relative to the shaft. The tapered shaft section 32 thus constitutes a stop means for limiting the rearward movement of the hub 52 on the shaft 31.

Each nozzle unit 28 (Figs. 3 and 4) is comprised of a head member 53 of a hexagonal shape having an externally threaded extension or stem portion 54 projected axially therefrom. The stem portion 54 is formed with an axially extended fluid passage 55 which projects axially within the head member 53 for junction or communication with a fluid passage 56 extended radially of the head member 53 and in a rearwardly inclined direction. In other words, the inner end 59 of the fluid passage 55 terminates adjacent the front side 58 of the head member 53, with the passage 56 from the inner end 59 of the passage 55 being inclined rearwardly and upwardly toward the rear side 60 of the head member, for termination in a discharge orifice 61 formed in a face 62 of the head member 53.

The stem portion 54 of the head member 53 is threadably engaged with the threaded portion 36 at the front end of the axial bore 34 formed in the shaft 31, to a position defined by the engagement of the rear side 60 of the head member 53 with a plastic or rubber washer 63 positioned on the reduced section 35 of the shaft 31. As a result, the passage 34 is fluid communicated with the passage 55, with the resilient washer 63 being positioned between the head member 53 and wiper arm hub 52 to maintain a fluid seal between such passages.

In use, each wiper arm assembly 30 is assembled on the engine cowl 12 in a usual manner by initially forwardly inserting as a unit the shaft 31 and journal housing 39 through a cowl opening 66 to a position defined by the engagement of the housing seat 41 with the underside of the cowl 12 about the opening 66. An ornamental cover 67 is then positioned over that portion of such unit which projects outwardly from the cowl opening 66. The cover 67 and housing 39 are then clamped together against opposite sides of the cowl 12 by usual fastening screws (not shown) extended through the cover 67 for threaded engagement within the housing 39. A fluid sealing gasket 69 is generally arranged between the cowl 12 and the ornamental cover member 67, which is provided with a removable plug 71 at a position opposite the lubricant openings 43 and 44 for the shaft 31. The forward end 72 of the ornamental cover 67 terminates slightly rearwardly of the fluted and tapered section 32 of the shaft 31.

The wiper arm 51 and nozzle unit 28 are then assembled on the front end of the shaft 31 in the manner previously described and the fluid conduit 75 attached about the reduced section 33 at the rear end of the shaft 31. Thus, the fluid discharged from the orifice 61 is directed rearwardly and upwardly onto the windshield 11 with the head member 53 being adjusted so that the fluid strikes the windshield parallel to one side of the wiper arm 51. By virtue of the resilience of the gasket or sealing washer 63 the head member 53 is capable of being adjustably rotated, relative to the shaft 31, to accomplish this adjustment of the direction of discharge of the orifice 61 without impairing the fluid sealing function of the gasket 63, or the locking action of the head member 53 relative to the wiper arm 51.

In use, on depression of the foot plunger 21 the fluid under pressure from the conduits 75 is admitted directly into the fluid passages 34 and into the passages 55 and 56 for discharge from the orifices 61.

In Fig. 6 there is illustrated a modified form of nozzle assembly similar in all respects to the assembly of Fig. 3 except for the construction of the wiper supporting shaft 31 and the holding nut mounted on the front end thereof. Similar reference numerals with letter suffixes will thus be used in Fig. 5 to designate like parts in Fig. 3.

In the assembly of Fig. 5, the wiper supporting shaft 31a is formed with an axially extended fluid passage 34a which terminates at its front end 76 rearwardly of a reduced section 78 formed at the front end of the shaft 31a. The front end 76 of the fluid passage 34a communicates with a fluid discharge passage 77 extended radially of the shaft 31a in a rearwardly inclined direction so as to terminate in a discharge orifice 61a located on the outer surface of the shaft 31a between the wiper arm hub 52a and the ornamental cover 67a. Forwardly of the tapered and fluted section 32a, the shaft 31a is formed with the externally threaded reduced section 78 which receives a holding nut 79 for releasably holding the internally fluted hub 52a of the wiper arm 51a on the shaft section 32a. The fluid discharge passage 77 is initially formed in the shaft 31a so that when the wiper arm 51a is assembled on the shaft, the fluid discharged from the orifice 61a is directed rearwardly and upwardly to strike the automobile windshield adjacent one side of the wiper arm 51a during the swinging movement of the wiper arm.

From the above description it is seen that the nozzle assemblies of this invention can readily be constructed with and embodied as a part of a wiper arm assembly so as to appear as an integral part of such assembly. The installation of the nozzle assemblies is economically and quickly made since no cowl openings are required in addition to the cowl opening required for each wiper arm assembly. Further, in the assembly embodying the nozzle unit 28, the mounting of the head member 53 on the shaft 31 merely replaces the presently existing step of securing a holding nut on the wiper shaft for holding a wiper arm thereon.

Although the invention has been described with respect to a preferred embodiment thereof it is to be understood that it is not to be so limited since changes can be made therein which are within the full intended scope of this invention as described by the appended claims.

I claim:

1. In a windshield clearing system, a shaft having a fluid passage extended longitudinally therethrough, a windshield wiper arm mounted on one end of said shaft, a nozzle unit threadably mounted on said shaft outwardly of said wiper arm for adjustable movement longitudinally of said shaft toward and away from said wiper arm, said nozzle unit having a fluid discharge passage formed therein in fluid communication with said first fluid passage, with a first portion of said discharge passage being in axial alignment with said first fluid passage, and with a second portion of said fluid discharge passage being angularly arranged relative to said first portion, and a resilient fluid sealing washer arranged on said shaft between and in contact with said nozzle unit and said wiper arm, whereby said nozzle unit is adjustable on said shaft to position said second discharge passage portion to direct fluid into the path of movement of said wiper arm.

2. For use on an automobile having a windshield and an engine cowl extending forwardly from said windshield; a hollow supporting shaft carried by said cowl, a windshield wiper arm having a portion thereof positioned about the front end of said shaft, stop means formed on said shaft adjacent the front end thereof, with said stop means being in contact with said wiper arm portion so as to limit the rearward movement of said arm portion on said shaft, a resilient washer mounted on said shaft with one face thereof contacting the front side of said wiper arm, a nozzle unit including a head member having a stem portion receivable in the front end of said hollow shaft, with said head member being formed so as to contact the other face of said washer whereby to clamp said wiper arm on said shaft against forward movement on the shaft, and means forming a fluid passage in said head member in fluid communication with the interior of said shaft.

3. For use on an automobile having a windshield and an engine cowl extended forwardly from said windshield; a hollow shaft carried on said cowl, a windshield wiper arm secured to said shaft adjacent the front end thereof, a nozzle unit comprising a head member having a rear face, a projection formed on said rear face threadably mounted in said one end of said hollow shaft to provide for the rotatable adjustment of said head member relative to the shaft, said head member having a fluid discharge passage formed therein in fluid communication with the interior of said shaft, means including a resilient fluid sealing washer mounted on said shaft and arranged between said wiper arm and said head member so as to be clamped therebetween, said washer acting to maintain the head member in a fluid sealed relation with said shaft when the head member is adjustably rotated relative to the shaft.

References Cited in the file of this patent

UNITED STATES PATENTS

| 2,609,561 | Wernig | Sept. 9, 1952 |
| 2,620,503 | Boothby | Dec. 9, 1952 |